(12) United States Patent
Witherspoon

(10) Patent No.: US 7,044,365 B2
(45) Date of Patent: May 16, 2006

(54) METHOD FOR RECONCILING A FINANCIAL ACCOUNT FROM A PORTABLE ACCOUNT REGISTER

(75) Inventor: Glenn Steven Witherspoon, St. Helena, CA (US)

(73) Assignee: AccuBalance Corporation, St. Helena, CA (US)

( * ) Notice: Subject to any disclaimer, the term of this patent is extended or adjusted under 35 U.S.C. 154(b) by 0 days.

(21) Appl. No.: 10/726,754

(22) Filed: Dec. 2, 2003

(65) Prior Publication Data

US 2004/0108376 A1 Jun. 10, 2004

Related U.S. Application Data

(60) Provisional application No. 60/431,771, filed on Dec. 9, 2002.

(51) Int. Cl.
*G06F 17/60* (2006.01)
(52) U.S. Cl. .................................................... 235/379
(58) Field of Classification Search ................ 235/379, 235/380; 902/24, 26; 705/35, 36, 37, 42
See application file for complete search history.

(56) References Cited

U.S. PATENT DOCUMENTS

| 4,625,276 | A | * | 11/1986 | Benton et al. ................. 705/44 |
| 4,724,527 | A | | 2/1988 | Nishimura et al. |
| 4,910,696 | A | | 3/1990 | Grossman et al. |
| 5,093,787 | A | * | 3/1992 | Simmons ..................... 705/33 |
| 5,134,564 | A | * | 7/1992 | Dunn et al. .................. 705/33 |
| 5,221,838 | A | | 6/1993 | Gutman et al. |
| 5,233,547 | A | * | 8/1993 | Kapp et al. .................. 708/106 |
| 5,337,263 | A | * | 8/1994 | Patermaster ................ 708/106 |
| 5,453,601 | A | * | 9/1995 | Rosen .......................... 705/65 |
| 5,455,407 | A | * | 10/1995 | Rosen .......................... 705/69 |
| 5,649,115 | A | * | 7/1997 | Schrader et al. .............. 705/33 |
| 5,748,737 | A | * | 5/1998 | Daggar ........................ 705/41 |
| 5,842,185 | A | * | 11/1998 | Chancey et al. .............. 705/40 |
| 5,898,154 | A | * | 4/1999 | Rosen .......................... 235/379 |
| 5,903,881 | A | * | 5/1999 | Schrader et al. .............. 705/42 |
| 5,920,848 | A | * | 7/1999 | Schutzer et al. .............. 705/42 |
| 6,038,549 | A | * | 3/2000 | Davis et al. .................. 705/35 |
| 6,305,603 | B1 | | 10/2001 | Grunbok, Jr. et al. |
| 6,446,048 | B1 | * | 9/2002 | Wells et al. .................. 705/35 |
| 6,533,173 | B1 | * | 3/2003 | Benyak ....................... 235/383 |
| 6,609,095 | B1 | * | 8/2003 | Krause ........................ 704/270 |
| 6,757,716 | B1 | * | 6/2004 | Blegen et al. ............... 709/217 |
| 6,800,029 | B1 | * | 10/2004 | Rowe et al. .................. 463/25 |

(Continued)

FOREIGN PATENT DOCUMENTS

GB    2 387 930 A    10/2003

*Primary Examiner*—Uyen-Chau N. Le
(74) *Attorney, Agent, or Firm*—Townsend and Townsend and Crew, LLP

(57) ABSTRACT

A method for reconciling a financial account of a user on a user device. A user list of transactions that have been entered by the user are accessed. A list of transactions from a financial institution is downloaded. The financial institution list is stored on the user device, and then compared with the user list, item by item. A reconciliation function is provided for each item on both of the lists. In one embodiment, a separate display of the cleared balance is provided, a single link button is provided to enable the upload of the register contents to a computer for reconciliation or for archiving and a memory attachment, such as a USB memory key, is also provided for archiving and/or additional program capabilities.

15 Claims, 15 Drawing Sheets

U.S. PATENT DOCUMENTS

| | | | |
|---|---|---|---|
| 6,825,940 B1 * | 11/2004 | Wu et al. | 358/1.15 |
| 2002/0026416 A1 | 2/2002 | Provinse | |
| 2002/0091635 A1 | 7/2002 | Dilip et al. | |
| 2002/0180696 A1 | 12/2002 | Maritzen et al. | |
| 2003/0046229 A1 * | 3/2003 | Cresswell | 705/42 |
| 2003/0083967 A1 | 5/2003 | Fleming | |

* cited by examiner

Right Edge View
Personal Digital Account Register

Bottom View

Example of Wired Connection

Edit List Screen #1

Add, Change, or Remove This Description: _ _ _ _ _ _

Automatic Description Add Feature   On ○   Off ○

[Help]   [Next]

FIG. 7

Edit List Screen #2

Change or Remove This Description: _ _ _ _ _

[Save]   [Remove]

FIG. 8

Initialization Screen #1

> Enter Desired Date Format:
>
> MM/DD/YYYY  o
>
> OR
>
> DD/MM/YYYY  o
>
>
> Enter Desired Time Format:
>
> 12-Hour (example 1:00 PM)  o
>
> OR
>
> 24-Hour (example 13:00)  o
>
> [Next]   [Help]

*FIG. 9*

Initialization Screen #2

> Enter Current Time:
>
> __/__/____
>
> Enter Current Time:
>
> __:__  AM o  PM o
>
> [Next]   [Help]

*FIG. 10*

Initialization Screen #3

Enter The Account Number For This Register:

_ _ _ _ _ _ _ _ _

Enter The Beginning Balance For This Register:

$_ _ _ _ _ _ _ _ . _ _

Done     Help

*FIG. 11*

Items Matched

| | "Clear" in Account Register | Unmatch |
|---|---|---|
| Matched Register Item #1<br>Match Bank Item #1 | o | o |
| Matched Register Item #2<br>Match Bank Item #2 | o | o |
| Matched Register Item #3<br>Match Bank Item #3 | o | o |
| . | | |
| . | | |
| . | | |

Items on Account Register, But Not on Statement

| | Leave in Account Register | Entry Error, Delete Add to Account Register |
|---|---|---|
| Register Item #1 | o | o |
| Register Item #2 | o | o |
| Register Item #3 | o | o |
| . | | |
| . | | |
| . | | |

Items on Statement, But Not in Account Register

| | Add to Accuont Register |
|---|---|
| Bank Item #1 | o |
| Bank Item #2 | o |
| Bank Item #3 | o |
| . | |
| . | |
| . | |

Manual Matching

| Register Item # | Bank Item # |
|---|---|
| — | — |
| — | — |
| — | — |

| Refresh | Next |

*FIG. 14*

Do you want to save "Cleared" items to your account register?

Yes    No

FIG. 15

Account Register Management
Select a register to view or export

| | Account # | Start Date | End Date | Beginning Check # | Ending Check # |
|---|---|---|---|---|---|
| o | xxxxxxxxx | mm/dd/yyyy | mm/dd/yyyy | xxxx | xxxx |
| o | xxxxxxxxx | mm/dd/yyyy | mm/dd/yyyy | xxxx | xxxx |

FIG. 16

Screen #6

Do you want to view or export this register?

View    Export

FIG. 17

Account Register - View

| Account # | Start Date | End Date | Beginning Check # | Ending Check # |
|---|---|---|---|---|
| xxxxxxxxxx | mm/dd/yyyy | mm/dd/yyyy | xxxx | xxxx |

| Number | Date | Description | Payment | Deposit | Balance |
|---|---|---|---|---|---|
| xxxx | mm/dd | xxxxxxxxxxxxxx | xx.xx | | xxxxx.xx |
| xxxx | mm/dd | xxxxxxxxxxxxxx | | xxx.xx | xxxxx.xx |
| . | | | | | |
| . | | | | | |
| . | | | | | |

[ View Another ]   [ Main Menu ]

Account Register - Export

Export to Microsoft Money Format   o

Export to Intuit Quicken Format   o

[ Export ]

Welcome to the account reconciliation program setup!!!

Will you be using the automated account reconciliation feature?

[ Yes ]   [ No ]

*FIG. 20*

Initialization Screen #2

> Enter your software license key for the
> automated account reconciliation service,
> then click on "Verify":
>
> ____-____-____-____
>
> [ Verify ]

FIG. 21

Initialization Screen #3

> In order to use automated account reconciliation,
> you need to enter your online banking information:
>
> Enter your Bank's Internet address to access online banking: _____
>
> Enter your username for accessing your account: _____
>
> Enter your password for accessing your account: _____
>
> [ Next ]    [ Help ]

FIG. 22

Initialization Screen #4

> Enter an account number for each account register
> you plan to use with the reconciliation program:
>
> Account #: _____
> Account #: _____
> Account #: _____
> Account #: _____
>
> [ Next ]    [ Help ]

FIG. 23

Initialization Screen #5

| Enter the number of days + or - to be used for reconciliation: 3 | | |
|---|---|---|
| | Done | Help |

METHOD FOR RECONCILING A FINANCIAL ACCOUNT FROM A PORTABLE ACCOUNT REGISTER

CROSS-REFERENCES TO RELATED APPLICATIONS

This application claims priority from Provisional Application No. 60/431,771, filed Dec. 9, 2002, entitled, "Personal Digital Account Register", which disclosure is incorporated herein by reference.

BACKGROUND OF THE INVENTION

The present invention relates to handheld devices for electronically storing financial account transactions, in particular to an electronic account register.

A number of devices have been devised to replace the paper check register many people carry in their checkbooks for recording checks written, deposits made, etc. One example in U.S. Pat. No. 4,724,527 shows an electronic calculator with additional functionality for recording a balance in a check account and updating it in accordance with checks written and deposits made. The input is a simple numeric keypad with a few other function keys and a small LCD display. A similar device is shown in U.S. Pat. No. 4,910,696 with a slightly larger display and navigation buttons added. Motorola U.S. Pat. No. 5,221,838 describes an electronic wallet which not only can store financial information, but can communicate that to a financial institution. It also includes a magnetic card reader for reading credit cards or other financial cards. It also includes a check printer and an ability to communicate wirelessly in real time with a financial institution to update records.

IBM U.S Pat. No. 6,305,603 shows a personal digital assistant for electronically handling financial transactions for multiple accounts. Another device for electronically tracking financial transactions and updating financial records is shown in U.S. Pat. No. 6,609,095.

A digital checkbook for processing electronic checks is shown in Publication No. U.S. 2003/0046229. Publication No. U.S. 2002/0091635 shows a system for authenticating users and facilitating financial transactions over a network.

U.S. Pat. No. 5,093,787 shows an electronic checkbook with limited memory that can upload its data to a bank computer for reconciliation. The bank computer attempts to automatically reconcile mismatched entries by looking at dates and amounts of the transaction. The user can accept the entire automatic reconciliation, or opt out and do a manual procedure.

Intel U.S. Publication No. 2003/0083967 shows an electronic check register combined with an electronic check display and a printout. Data can be entered either on the electronic register or on the electronic check and be auto-filled into the other one. Provisions are described for a list of favorite payees and automatic filling of all but the payee and amount. The device is stated to support reconciliation, but there is no detailed description of how this is done.

BRIEF SUMMARY OF THE INVENTION

The present invention provides a method for reconciling a financial account of a user on a user device. A user list of transactions that have been entered by the user are accessed. A list of transactions from a financial institution is downloaded. The financial institution list is stored on the user device, and then compared with the user list, item by item. A reconciliation function is provided for each item on both of the lists.

The present invention thus does not require a bank or financial institution to modify its system to do such reconciliations, using the existing ability to download off of the Internet or otherwise. The invention also provides more than the balance reconciliation provided in some prior art devices, allowing a reconciliation item by item.

In one embodiment, software implementing the present invention attempts to match unmatched transactions using predetermined criteria. The software then presents the proposed matches to the user for confirmation on an item by item basis. This software also identifies any unmatched transactions on both the user list and the financial institution list. The user is provided the ability to match up such transactions manually.

In one embodiment, the invention provides an electronic account register with a simplified set of input keys and a display. A screen displays an account register, and the device also provides both an alphanumeric and numeric keypad, along with an up/down scrolling input. A separate display of the cleared balance is provided (which will often be different from the current balance recorded in the account register). A number of features are provided to provide ease of input, such as automatic populating of a next transaction number, providing a drop-down list of preferred payees, providing a forward-fill capability, while also providing the ability to override these automatic aids. A single link button is provided to enable the upload of the register contents to a computer or other device for reconciliation or for archiving. A USB or other port or memory card slot is optionally provided for archiving and/or additional program capabilities.

The present invention does not attempt a complicated design to make the issuance of checks completely electronic. Rather, the invention relies on users continuing to issue paper checks, and automates as much as possible the account register function.

For a further understanding of the nature and advantages of the invention, reference should be made to the following description taken in conjunction with the accompanying drawings.

BRIEF DESCRIPTION OF THE DRAWINGS

FIGS. 7 and 8 are diagrams of edit list screens on an account register according to an embodiment of the invention.

FIGS. 9–11 are diagrams of initialization screens on an embodiment of the register according to the invention.

FIGS. 13–15 are diagrams of reconciliation screens in an embodiment of the reconciliation program according to the present invention.

FIGS. 16–19 are diagrams of screens of an embodiment of the reconciliation program for viewing and exporting account registers.

FIGS. 20–24 are diagrams of displays for initialization of a reconciliation program according to an embodiment of the invention.

DETAILED DESCRIPTION OF THE INVENTION

Personal Digital Account Register

Figure 1:
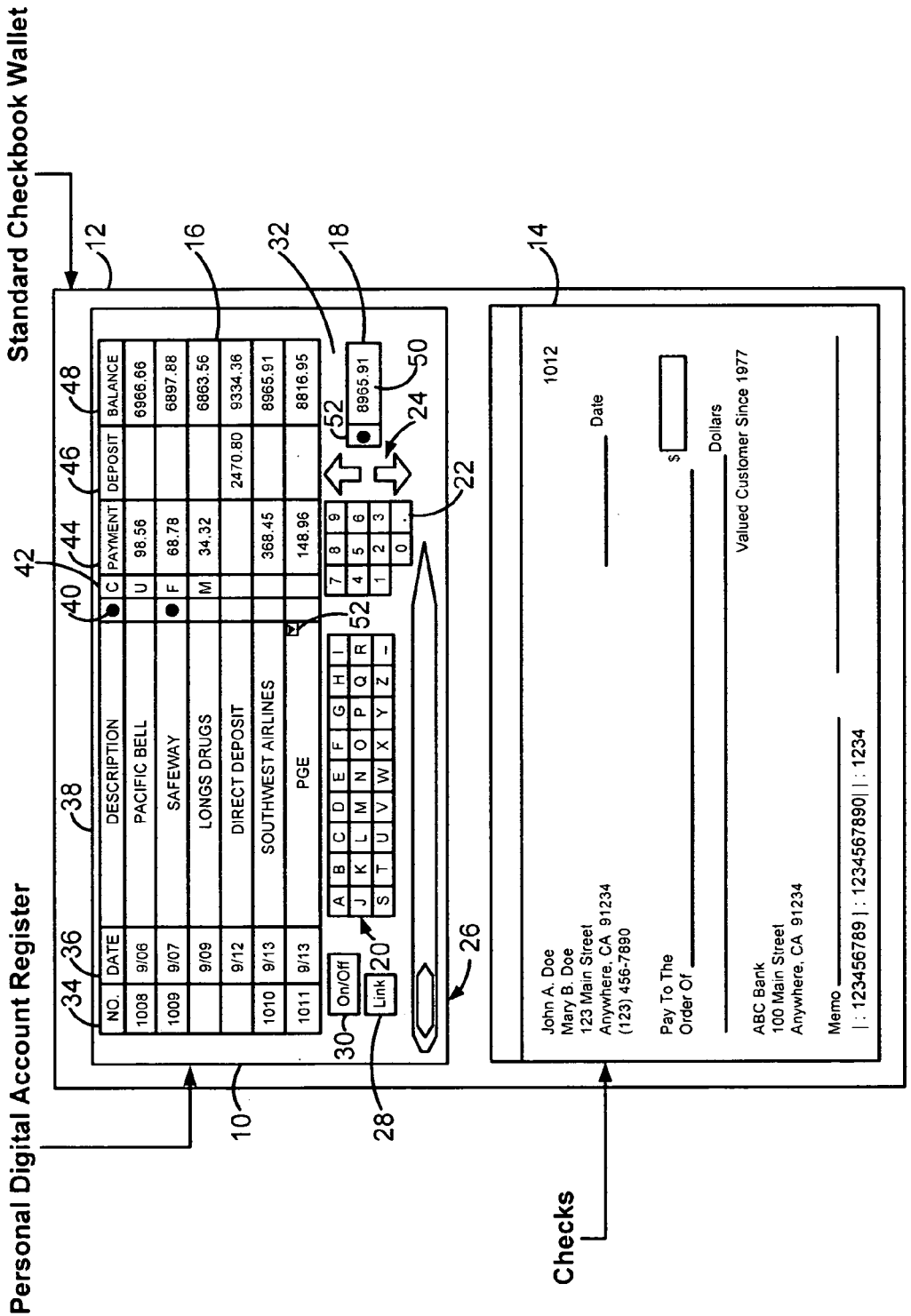
FIG. 1 is a diagram of a personal digital account register according to an embodiment of the invention in a checkbook wallet.

FIG. 1 illustrates an embodiment of a personal digital account register 10 according to the present invention mounted in a standard flexible checkbook wallet 12 which also holds paper checks 14. The register contains a display 16 of an account register and a separate cleared balance display 18. A user can provide inputs through an alphabetic keyboard 20 and a numeric keypad 22. Also provided are up and down scrolling buttons 24. A stylus 26 is provided in a recess, for use in entering data on the display. A link button 28 is provided for initiating a link with a personal computer or other electronic device. Finally, a recessed on/off switch 30 is provided.

In one embodiment, the user buttons are separate from the display, and cleared account balance display 18 is a separate LCD display. In another embodiment, cleared account balance display 18 can be part of a same display as 16, but can appear to the user to be a separate display by separating it from display area 16 with a portion of the housing 32 extending between the display areas to separate them. Similarly, all of the user buttons could be touch screen buttons on a single display, a display separated by portions of the housing, or on a display which is integrated with the account register display 16.

The account register screen 16 is preferably a touch screen in which a stylus can activate different items. A first field 34 is a transaction number field. Its default value is blank, but with one tap, the next transaction number in sequence automatically appears (a next check number is an example, but other transactions, such as ATM withdrawals or debit card uses could be assigned a transaction number). A second tap will provide a blinking cursor allowing the user to make a numeric entry, such as for an out-of-sequence check number.

A date field 36 provides a default value of the current date. A single tap will bring up a drop-down calendar to allow post or past dated entries.

A description field 38 is used for entering descriptions, such as the name of a check payee. The default value is blank, with a blinking cursor to allow alphanumeric entry of a custom description. A single tap at the drop down arrow 54 will cause a drop-down table of stored descriptions to appear. As described below, this can include descriptions of payees that the user has entered multiple times, to facilitate easy entry of recurring payees for standard items such as rent, utilities, etc.

Field 40 is a "cleared" field. The default value is blank, but a single tap will enter a "cleared" symbol, a dot in this embodiment (alternately a check mark or any other symbol). In typical usage, the user will not enter this manually, but rather it would be done by the automatic reconciliation program described below. However, a user can reconcile via manual clearing if automatic reconciliation is not used.

Field 42 is an input field for an alphanumeric entry such as an expense code. The default value is blank, and a single tap will bring up a blinking cursor for alphanumeric entry.

Field 44 is a payment field for entry of a payment amount. The default value is blank, and a single tap will bring up a cursor to allow numeric entry. In one optional embodiment, a default value can appear for a recurring description, with the default value being overridable. Thus, if the mortgage is the same every month, it can be automatically entered here when the mortgage payee name is selected, with the ability to be confirmed or changed by the user. In addition to the mortgage payee, the mortgage amount could be automatically populated as well when the mortgage payee appears. In addition, an expense code could automatically appear as well. The user could set it up in advance to populate the payee, amount and expense code automatically.

Field 46 is a deposit field for entering deposit amounts. The default value is blank and a single tap will bring up a blinking cursor to allow a numeric entry.

Field 48 is a balance field which displays the current balance. This is the previous value of the balance field directly above, less the payment in field 44 or plus the deposit in field 46.

Cleared account display 18 includes a display 50 which shows the cleared balance, reproduced from the last reconciled balance, less any new "cleared" payments (field 44) if a cleared symbol is in corresponding "cleared" field 40, plus "cleared" deposits (field 46) if a "cleared" symbol is in corresponding "cleared" field (40).

The personal digital account register of FIG. 1 has a number of features which make it very simple to use. The next transaction number in sequence is automatically entered as a default, with the current date also being entered, eliminating the need for the user to enter these numbers in most cases. A drop-down list of frequent payees, depositors, or other transaction descriptions is provided, eliminating the need for the user to write these out or type these in each time. This drop down list is accessed by tapping arrow 54 which will be displayed in the current input line. In addition, a forward-fill feature is provided, so that when a user types in the first few letters, a number of guesses as to the possible complete word can be displayed, further facilitating ease of entry. Upon entry of the payment or deposit amount, the balance is automatically updated without need for any calculation or entry by the user. As will be described below, the marking of cleared items is automatically done in a reconciliation program, with the ability for unmatched entries to be manually reconciled by the user.

Figure 1A:
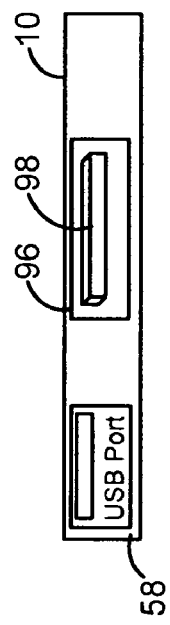
FIG. 1A is a right edge view of the account register of FIG. 1.

FIG. 1A is a right edge view of personal digital account register 10 showing a USB port 58. Note that instead of the USB port, any type of communication port could be used, or a wireless interface could be used, or some combination. For example, the data transfer connector capability could be serial, parallel, Ethernet, infrared, 802.11 wireless, Bluetooth wireless, spread spectrum, or any other communication protocol.

The account register has sufficient internal memory for years of registers. One may wish more capacity for archiving records. In one embodiment, a USB memory key could be used, which plugs into the USB port and contains internal memory in the key. In another embodiment, the account register includes a separate memory port 96 which may hold a removable memory 98, such as a flash memory card. This could be used for archiving data, and could connect to additional external memory, a memory stick, expansion cards, etc. for additional software/memory, etc.

Figure 2:
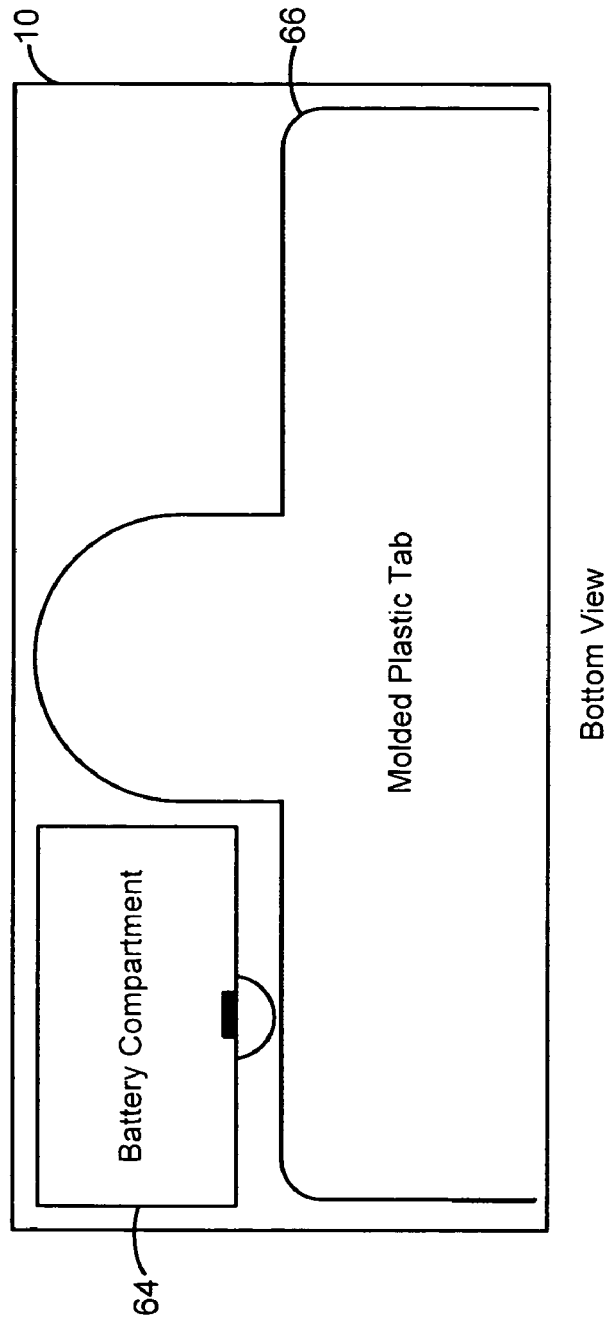
FIG. 2 is a bottom view of the account register of FIG. 1.

FIG. 2 is a bottom view of account register 10 showing a battery compartment 64 and a molded plastic tab 66. Plastic tab 66 allows the account register to be inserted in the standard flap of a checkbook wallet 12 as shown in FIG. 1 (alternative forms of securing the account register could of course be used). Instead of replaceable batteries in a battery compartment 64, a rechargeable battery could be used, with a connector being provided to a recharger.

Figure 3:
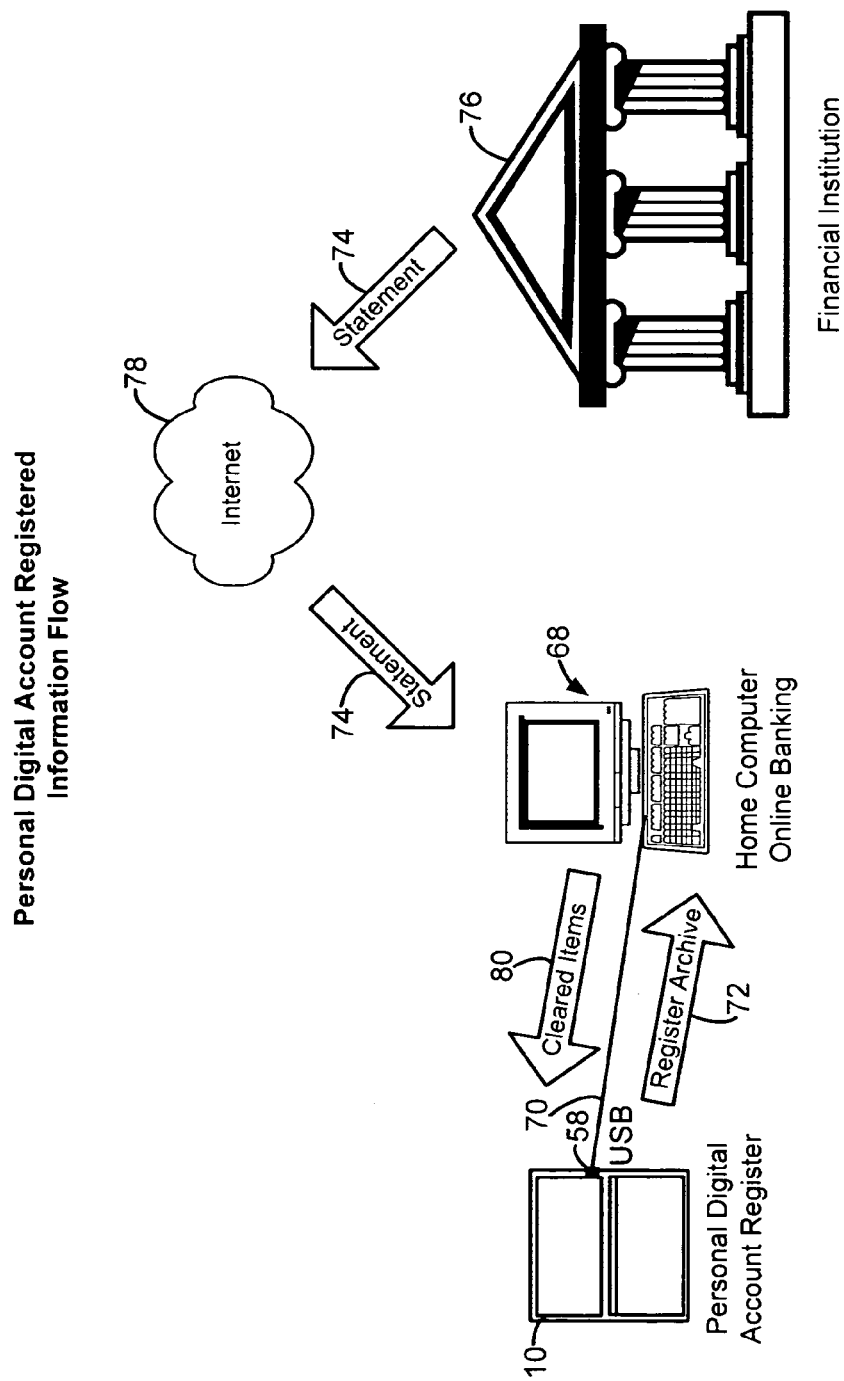
FIG. 3 is a diagram of information flow in a wired connection to a computer, itself connected to a financial institution by the Internet according to an embodiment of the invention.

FIG. 3 is a diagram of a system for reconciling the account on the personal digital account register 10 of the present invention. In this embodiment, the reconciliation program would be on a personal computer 68, with the register 10 connected to the computer by a USB line 70.

In the operation depicted here, a USB connection would be made, and the link button would be pressed. The register archive values from register 10 would be uploaded to the computer 68 as indicated by arrow 72. The computer will download the user's account statement 74 from a financial institution 76 through the Internet 78. After the computer software program performs the reconciliation program (described below) the cleared items 80 are downloaded to the register 10 which will then populate field 40 of FIG. 1 with the appropriate designation indicating that particular items are cleared.

Figure 4:
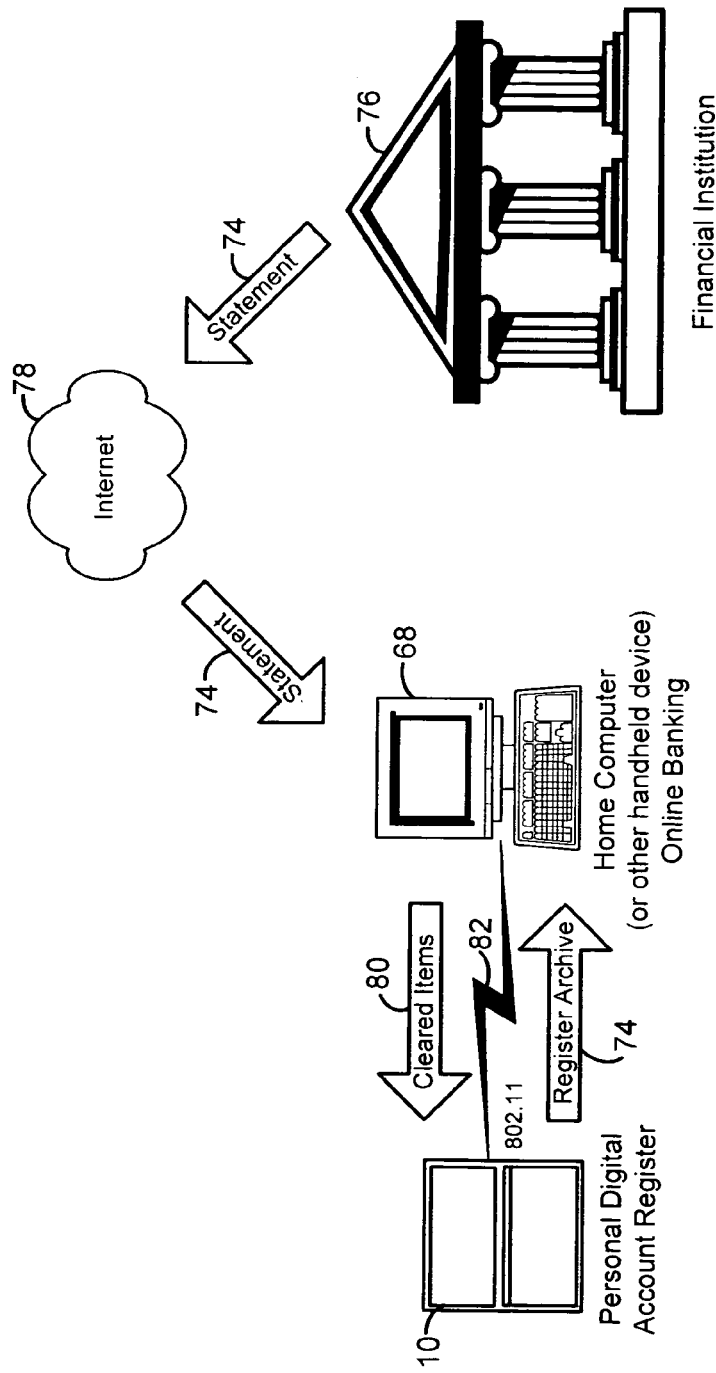
FIG. 4 is a modification of the system of FIG. 3 showing a wireless connection between the account register and the computer.

FIG. 4 is a diagram of an alternate embodiment in which the wired USB connection of FIG. 3 has been replaced by a wireless connection 82, such as an 802.11 connection.

Figure 5:
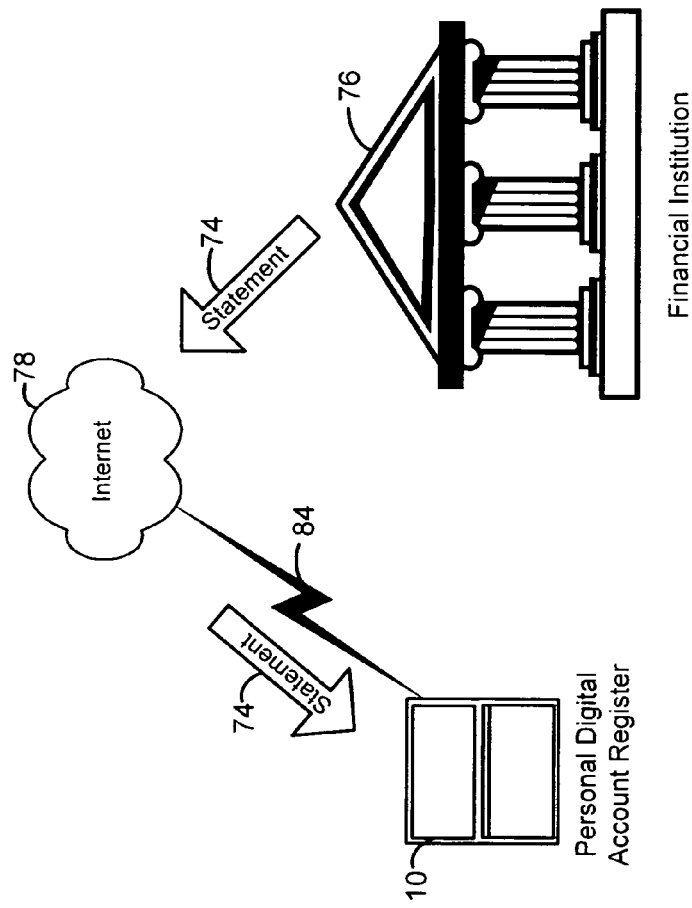
FIG. 5 is a diagram of an embodiment of the invention showing a direct Internet connection to a financial institution for performing reconciliation on the account register itself.

FIG. 5 shows yet another embodiment in which the personal computer has been eliminated, and instead the reconciliation program is run on the account register 10 itself. Register 10 is connected to the Internet 78 through a wireless connection 84. Alternately, a wired connection might be used. Or, the account register could be connected directly to a cable or DSL modem, or other internet access device, without needing to go through a computer.

Figure 6:
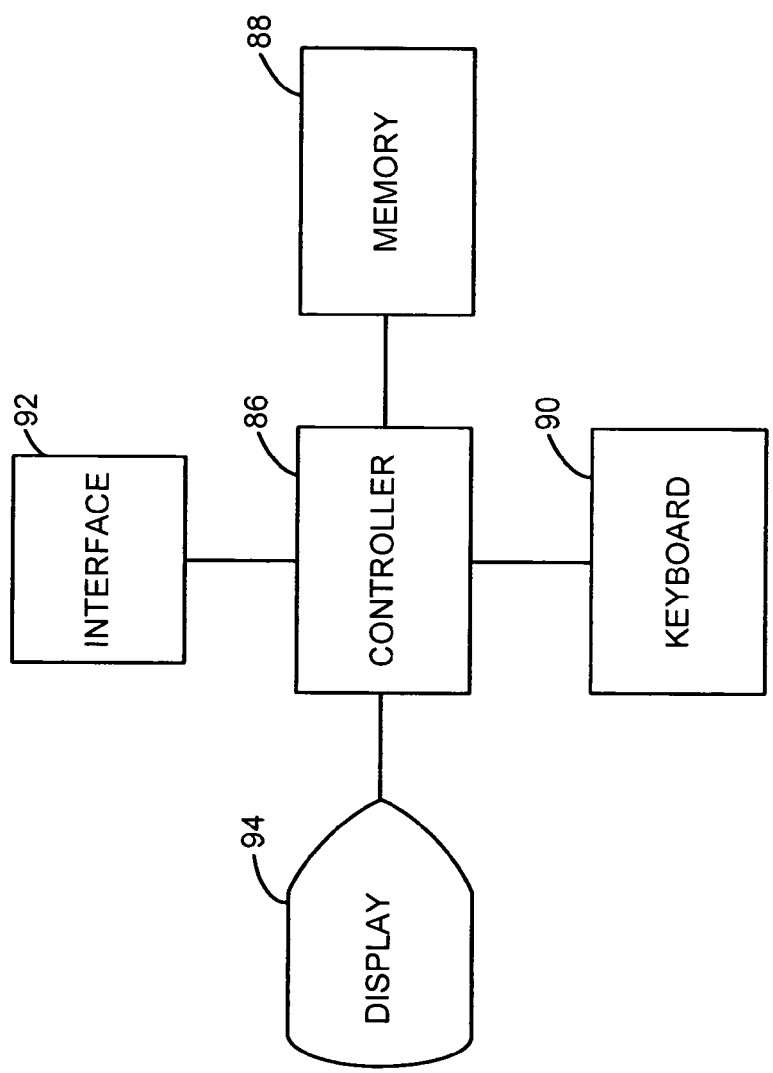
FIG. 6 is a block diagram of the internal electronics of an embodiment of the account register.

FIG. 6 is a block diagram of the internal electronics of an embodiment of account register 10. A microcontroller or microprocessor 86 is connected to memory 88, which may include ROM, SRAM and other memory. The controller is connected to keyboard 90, including all of the input keys shown in FIG. 1 and the touch screen. An interface 92 is either a USB port or other wired connection, or a wireless connection, or other connection or combination. A display with a display controller 94 is provided to control the display shown in FIG. 1.

Although FIGS. 3–5 show systems where the reconciliation program is run on a computer or the account register itself, other possibilities are available. For example, the account register could be connected to any other electronic device which could run the reconciliation program, such as a personal digital assistant (PDA), a cell phone, or other handheld device. In an alternate embodiment, the account register itself could be stored on a PDA with its own touch screen display added to the available menu of displays on the PDA. Alternately, the account register could be included in a cell phone or other handheld device.

The drop-down list for the "description" field will include an "edit list" selection, allowing for adding, changing or removing list entries. Selecting "edit list" will present a pop-up screen such as shown in FIG. 7. The blank description field shown in FIG. 7 will have a description start to be entered by the user, then will have a forward fill feature pull up existing matching descriptions which the user can select, or a new entry can be entered here. The "automatic description add feature" has on and off buttons which can be clicked by the user. This screen can be used in the absence of a specific description to turn on an automatic add feature whereby a description will be automatically added to the drop-down list if it is not currently on the list and it has been entered in the description field in the last designated time period (e.g., 30 or 40 days to cover a month cycle). The drop-down list will include a set of default entries from the factory. These will include common account register entries such as "ATM withdrawal, ATM deposit, deposit, withdrawal, direct deposit, direct deposit advance, monthly fee, bank fee," etc.

Returning to a transaction register field shown in FIG. 1, the default cursor position for a new record is the description field, with the payment field being the second default movement. The description field will include the automatic forward-fill capability based on values from the drop-down list. The forward fill capability can also be used to access the drop-down list from that point, alphabetically. For example, if you enter the letter G in the description field, then tap the drop-down arrow 54, the drop-down arrow will take you to the first field description that begins with the letter G in the drop-down list, which is scrollable.

When "Edit List" is selected from the Description field drop-down list, Edit List Screen #1 of FIG. 7 appears.
1. If an existing description is entered in the "Add, Change, or Remove This Description" field, then Edit List Screen #2 appears when "Next" is selected.
2. "Add, Change, or Remove This Description" uses forward fill to display the correct description from the list, if it exists.
3. If a new description is added, a pop-up displaying "Description _____ has been added to your list." appears when "Next" is selected.
4. "Automatic Description Add Feature" displays current setting (default is "On") and allows the user to change the setting.

Edit List Screen #2 is shown in FIG. 8.
1. The description field is a display (output) field from Edit List Screen #1 input.
2. Once "Save" or "Remove" is selected, a confirmation message pop-up appears: "Description _____ has been saved to your list." when "Save" is selected. "Description _____ has been removed from your list." when "Remove" is selected.

Product Initialization

Upon initial use or when reset button has been pressed, Initialization Screen #1 shown in FIG. 9 appears. When "Next" is selected, Initialization Screen #2 of FIG. 10 appears.
1. AM/PM option only appears in Initialization Screen #2 if the 12-Hour option was selected in Initialization Screen #1.
2. Current date entered in Initialization Screen #2 must correspond to the date format selected in Initialization Screen #1.
3. When "Next" is selected, Initialization Screen #3 appears. Initialization Screen #3 is shown in FIG. 11.
1. Beginning Balance entry is a "free form" entry box with the cursor beginning to the right of the dollar sign and the decimal point required input.
2. When "Done" is selected, initialization is complete.

Reconciliation Program

The present invention provides a reconciliation program which may be run either on a computer, the account register itself, or some other electronic device. As described earlier, the user's financial institution statement is downloaded from the bank using commercially available download facilities over the Internet or otherwise. The user's register is uploaded, if necessary, from the account register.

The reconciliation program provides automatic reconciliation within limits that can be configured by the user. The user then is able to verify and accept the reconciliation on an item-by-item basis. The software will first compare transaction numbers from the register with those in the bank statement and verify that the numbers match. For all other entries, amounts can be compared, a date range can be searched, and a description field can be searched for the same or a similar payee. The date range parameters can be initialized by the user, such as by setting a 5-day or other range in which to compare entries.

The program can then flag for the user items where there is not an exact match (see FIG. 14). This would be relevant, for example, for debit card uses, ATM withdrawals, deposits, etc., where the user puts in a date on the account register which is different from the settlement date, such as next business day, when the bank actually records the entry.

Completely matching transactions are automatically denoted in a "cleared" field of the corresponding record to be downloaded to the account register device. A "cleared balance" is calculated based on adding cleared deposits and subtracting cleared debits, and then displayed. The account register's "cleared balance" can be compared by the user with the balance stated by the financial institution.

Examples of user interface displays for reconciliation program are set forth below. These displays as shown are intended for a personal computer, but can be modified to fit them on a smaller account register device screen.

Figure 12:
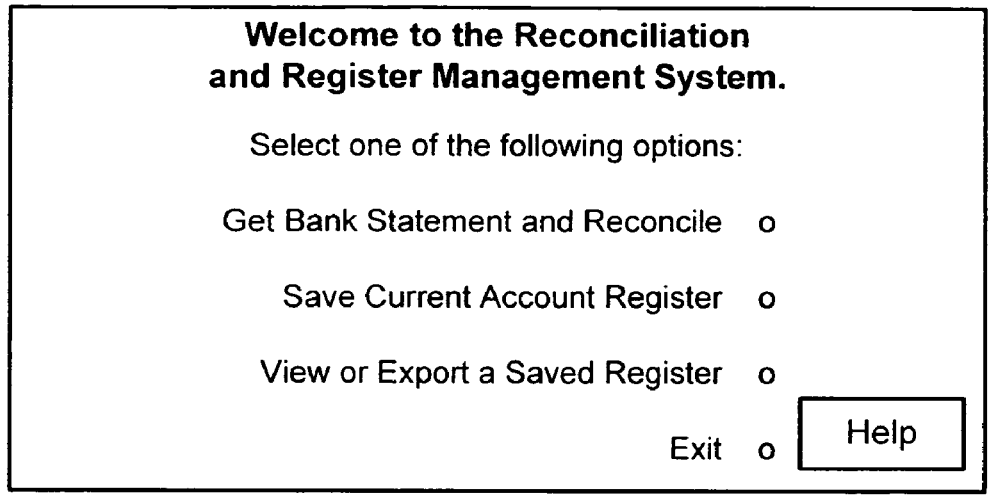
FIG. 12 is a diagram of the main menu of a reconciliation program according to an embodiment of the invention.

When the "Link" button is pressed on the account register device, the reconciliation program starts on the computer and the Reconciliation and Register Management System Main Menu appears, as shown in FIG. 12.

1. When "Get Bank Statement and Reconcile" is selected, statement download is initiated from the financial institution, and Screen #2 (FIG. 13) appears.
2. When "Save Current Account Register" is selected, the current account register is saved, a confirmation pop-up appears, the ending balance is downloaded to the account register device, and the Main Menu appears.
3. When "View or Export a Saved Register" is selected, Screen #5 (FIG. 16) appears.
4. When "Exit" is selected, program ends.

Figure 13:
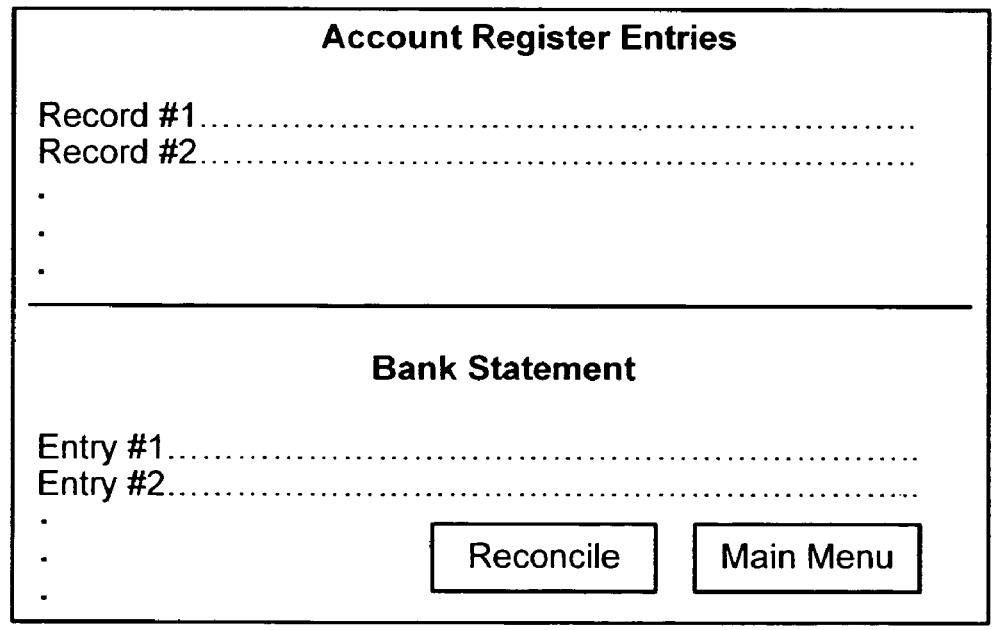

Screen #2 is shown in FIG. 13.

1. This screen represents the raw data from the account register and the bank statement. Account register data represents items not cleared (items without an indicator in field 40).
2. When "Reconcile" is selected, reconciliation algorithms run (see below), then Screen #3 (FIG. 14) appears.
3. When "Main Menu" is selected, the Main Menu (FIG. 12) appears.

Screen #3 is shown in FIG. 14. This screen conveniently groups all items based on the results of the reconciliation algorithms (see below). The first group of "Items Matched" shows the items the program attempted to match based on the algorithms below, with an ability by the user to accept each match, item by item. The second and third groups show items in the account register that are not on the bank statement, and vice-versa. The last grouping is for manual matching by the user. The user can enter item numbers from corresponding sections 2 and 3 (see below).

1. "Items Matched" list is formed by performing the following algorithms on the raw data. Transaction numbers (field 34) will be matched directly. All other transactions will be matched by taking each bank deposit or withdrawal date/amount/description fields and searching for matching information in the account register records in corresponding fields 36, 44 or 46, 38. The date in the bank item should be matched with the date in the account register record plus or minus the number of days selected in the reconciliation program setup.

2. If "Clear in Account Register" is selected for the match, the corresponding account register record will be designated as "Cleared" with a dot in Field 40 and downloaded to the account register in the next screen.
3. If "Unmatch" is selected for the corresponding matched items, the Account Register Item will be placed in the "Items in Account Register, But Not on Statement" section and the Bank Item will be placed in the "Items on Statement, But Not in Account Register" section when the "Refresh" is selected.
4. If at least one "Unmatch" is selected, a "Refresh" must occur.
5. In the "Items Matched" section, each pair of transactions must have a selection entered, "Clear in Account Register" or "Unmatch".
6. "Clear in Account Register" is the default selection.
7. "Items in Account Register, But Not on Statement" are items that have not cleared the bank, or are account register entry errors. "Leave in Account Register" is the default selection. Nothing happens with these records when the download is selected in the next screen. If "Entry Error, Delete From Account Register" is selected, the corresponding record will be deleted from the account register device.
8. "Items on Statement, But Not in Account Register" are items that have not been entered into the account register device. The default selection is "Add to Account Register".
9. "Manual Matching" allows for matching an item number from the "Items in Account Register, But Not on Statement" list with an item number from the "Items on Statement, But Not in Account Register" list. A "Manual Matching" of a record overrides any selection made in the section corresponding to that record and a "Refresh" must occur.
10. When "Refresh" is selected, "Unmatched" items move to their corresponding lists, "Manual Matching" items move into the "Items Matched" list and out of their corresponding lists.
11. When "Next" is selected Screen #4 appears.

Screen #4 is shown in FIG. 15.

1. "Yes" selection transfers "Cleared" records to the account register device and deletes records selected in Section 2 of Screen #3 (FIG. 14), then returns to the Main Menu (FIG. 12).
2. "No" selection returns to Main Menu. When "View or Export a Saved Register" is selected from the Main Menu, the current account register is not saved, and Screen #5 appears.

Screen #5 is shown in FIG. 16.

1. This screen is scrollable.
2. When a register is selected, the following pop-up Screen #6 appears.

Screen #6 is shown in FIG. 17.

1. When "View" is selected, Screen #7 appears.
2. When "Export" is selected, Screen #8 appears.

Screen #7 is shown in FIG. 18.

1. When "View Another" is selected, Screen #5 appears.
2. When "Main Menu" is selected, the Main Menu (FIG. 12) appears.
3. This screen is scrollable.
Screen #8 is shown in FIG. 19.
1. When "Export" is selected, the file is converted, and a "Save To" dialog box appears.
2. Once the "Save To" location has been selected and the file has been saved, the Main Menu appears.

Product Initialization

Upon initial installation or re-installation of the software, Initialization Screen #1 (FIG. 20) is displayed.
1. When "Yes" is selected, Initialization Screen #2 appears.
2. When "No" is selected, initialization is complete.
Initialization Screen #2 is shown in FIG. 21.
1. User enters the software license key and selects "Verify".
2. If verification succeeds, Initialization Screen #3 appears.
3. If verification fails, a pop-up message appears stating, "Verification Failed, Contact Your Financial Institution". Initialization is complete and the reconciliation program runs without automated account reconciliation.
Initialization Screen #3 is shown in FIG. 22.
1. User enters corresponding online banking LOGIN information and selects "Next".
2. When "Next" is selected, Initialization Screen #4 appears.
Initialization Screen #4 is shown in FIG. 23.
1. User enters corresponding account number for each account register device to be used with this program.
2. When "Next" is selected, Initialization Screen #5 appears.
Initialization Screen #5 is shown in FIG. 24.
1. The default value is set to 3, however the user may enter a different value.
2. When "Done" is selected, initialization is complete.

As will be appreciated by those with skill in the art, the present invention may be embodied in other specific forms without departing from the essential characteristics thereof. For example, the account register could be provided on a PDA display, with its own customized display configuration. The reconciliation program can be run on any user device, such as the account register device itself, a personal computer, or on a separate electronic device. Accordingly, the foregoing description is intended to be illustrative, but not limiting, of the scope of the invention which is set forth in the following claims.

What is claimed is:

1. A method for reconciling a financial account of a user from a portable user electronic account register device, comprising:
   entering user financial transaction data on said portable electronic account register;
   uploading said transactions entered by said user as uploaded data to a personal computer;
   accessing on said personal computer, from said uploaded data, a user list of said transactions entered by said user on said portable user electronic account register device;
   downloading from a financial institution computer to said personal computer a financial institution list of transactions from a financial institution;
   comparing, on said personal computer, said user list and said financial institution list item by item;
   providing a reconciliation function for each item on both of said lists;
   downloading reconciliation information from said personal computer to on said user electronic account register device;
   comparing said transactions to match transactions on said financial institution list to transactions on said user list;
   identifying matched transactions;
   providing said matched transactions to a separate matched transaction field in a user display;
   identifying unmatched transactions;
   attempting to match said unmatched transactions, absent user input, according to predetermined criteria to provide proposed matches;
   presenting said proposed matches to said user in said matched transaction field of said user display;
   marking said proposed matches so that said user can see that they are not exact matches;
   presenting unmatched items to said user in a separate unmatched transaction field of said user display;
   accepting, on an item by item basis, a confirmation of said proposed matches by said user.

2. The method of claim 1 wherein said proposed matches are accepted absent a user unmatch input associated with said proposed matches, and proposed matches that receive a user unmatch input are moved to said unmatched transaction field of said user display.

3. The method of claim 1 wherein said presenting unmatched items comprises presenting said transactions to said user in the following groupings:
   transactions on said user list, but not on said financial institution list; and
   transactions on said financial institution list but not on said user list.

4. The method of claim 1 wherein said accessing a user list of transactions comprises uploading said user list from said electronic account register.

5. The method of claim 1 wherein said accessing and comparing are performed on said electronic account register, and said downloading is to said electronic account register.

6. The method of claim 1 further comprising:
   providing an indication whether an item has been cleared for each item upon completion of said reconciliation function.

7. The method of claim 1 further comprising:
   downloading cleared items, and items on said financial institution list of transactions but not on said user list, from a computer to said portable user electronic account register device.

8. The method of claim 1 further comprising:
   comparing said transactions to match transactions on said financial institution list to transactions on said user list;
   identifying unmatched transactions;
   accepting a user input indicating an acceptable number of days between transactions for indicating a possible match;
   attempting to match said unmatched transactions according to said user input.

9. The method of claim 1 further comprising:
   exporting data regarding said transactions to a money management program.

10. The method of claim 1 further comprising:
    receiving a link button input;
    presenting, on a display, in response to said link button input, the options of
    (a) getting a bank statement and reconciling; and
    (b) exporting a register of transaction items.

11. The method of claim 1 further comprising:
    marking items that match as cleared items;
    downloading said cleared items to said portable electronic account register.

12. The method of claim 1 wherein said step of storing reconciliation information on said user device further comprises:
  downloading an indication of cleared items to said account register; and
  downloading to said account register items in said financial institution list and not in said account register.

13. A method for reconciling a financial account of a user from a portable user electronic account register device, comprising:
  entering user financial transaction data on said portable electronic account register;
  uploading said transactions entered by said user as uploaded data to a personal computer;
  accessing on said personal computer, from said uploaded data, a user list of said transactions entered by said user on said portable user electronic account register device;
  downloading from a financial institution computer to said personal computer a financial institution list of transactions from a financial institution;
  comparing, on said personal computer, said user list and said financial institution list item by item;
  providing a reconciliation function for each item on both of said lists;
  comparing said transactions to match transactions on said financial institution list to transactions on said user list;
  identifying matched transactions;
  providing said matched transactions to a separate matched transaction field in a user display;
  identifying unmatched transactions;
  attempting to match said unmatched transactions, absent user input, according to predetermined criteria to provide proposed matches;
  presenting said proposed matches to said user in said matched transaction field of said user display;
  marking said proposed matches so that said user can see that they are not exact matches;
  presenting unmatched items to said user in a separate unmatched transaction field of said user display;
  accepting, on an item by item basis, a confirmation of said proposed matches by said user;
  presenting to said user a first group of transactions on said user list, but not on said financial institution list;
  presenting to said user a second group of transactions on said financial institution list but not on said user list;
  providing said user input capability for matching items from said first and second groups;
  providing an indication whether an item has been cleared for each item upon completion of said reconciliation function; and
  downloading reconciliation information from said personal computer to said user electronic account register device.

14. The method of claim 13 wherein said step of storing reconciliation information on said user device further comprises:
  downloading an indication of cleared items to said account register; and
  downloading to said account register items in said financial institution list and not in said account register.

15. A method for reconciling a financial account of a user from a portable user electronic account register device, comprising:
  entering user financial transaction data on said portable electronic account register;
  providing a drop down list of preferred payees in a description field of a display on said portable electronic account register;
  populating a transaction number field of said display with a next sequential transaction number;
  allowing said user to override said next sequential transaction number;
  uploading said transactions entered by said user as uploaded data to a personal computer;
  accessing on said personal computer, from said uploaded data, a user list of said transactions entered by said user on said portable user electronic account register device;
  downloading from a financial institution computer to said personal computer a financial institution list of transactions from a financial institution;
  comparing, on said personal computer, said user list and said financial institution list item by item;
  providing a reconciliation function for each item on both of said lists;
  comparing said transactions to match transactions on said financial institution list to transactions on said user list;
  identifying matched transactions;
  providing said matched transactions to a separate matched transaction field in a user display;
  identifying unmatched transactions;
  attempting to match said unmatched transactions, absent user input, according to predetermined criteria to provide proposed matches;
  presenting said proposed matches to said user in said matched transaction field of said user display;
  marking said proposed matches so that said user can see that they are not exact matches;
  presenting unmatched items to said user in a separate unmatched transaction field of said user display;
  accepting, on an item by item basis, a confirmation of said proposed matches by said user;
  presenting to said user a first group of transactions on said user list, but not on said financial institution list;
  presenting to said user a second group of transactions on said financial institution list but not on said user list;
  providing said user input capability for matching items from said first and second groups;
  providing an indication whether an item has been cleared for each item upon completion of said reconciliation function;
  downloading an indication of cleared items to said account register; and
  downloading to said account register items in said financial institution list and not in said account register;
  displaying a balance of cleared items on a cleared balance display.

* * * * *